Feb. 2, 1960 J. A. BLICKENSDERFER 2,923,922

DRUM INDEXING SYSTEM

Filed June 15, 1956 3 Sheets-Sheet 1

JOHN A. BLICKENSDERFER
INVENTOR.

BY Lyon & Lyon
ATTORNEYS

JOHN A. BLICKENSDERFER
INVENTOR.

BY Lyon & Lyon
ATTORNEYS

JOHN A. BLICKENSDERFER
INVENTOR.
BY Lyon & Lyon
ATTORNEYS

United States Patent Office 2,923,922

Patented Feb. 2, 1960

2,923,922

DRUM INDEXING SYSTEM

John A. Blickensderfer, Mountain View, Calif., assignor, by mesne assignments, to General Electric Company, New York, N.Y., a corporation of New York Application June 15, 1956, Serial No. 591,665

7 Claims. (Cl. 340—174)

This invention relates to information-handling systems and, more particularly, to an improved magnetic drum indexing system for utilization in information-handling machines.

The magnetic drum is used in present-day electronic information-handling machines, either as a main data-storage system for the machine or as a temporary data-storage system for the machine, or as a combination of both types of storage. In those systems where the drum is only used as a buffer store, the permanent storage devices may consist of magnetic tapes. In an application by W. Kautz, which is assigned to the same assignee and bears Serial No. 596,045, filed July 5, 1956, for a Buffer Storage System, there is described an arrangement whereby different areas of a drum are assigned to receive incoming information which is destined to be permanently stored on selected ones of the tapes. The storage arrangement requires that the data be sorted before it is placed on the tape, since the data being received by the information-handling machine is in random order; the system described employs a magnetic drum on which the random-order data is stored. Then it is read off and sorted in the process of being transferred from drum to tape. In order to simplify the sorting arrangement, predetermined sectors of the drum are assigned to selected ones of the tapes. Since incoming data always bears some identification by which it can be subsequently sorted, it is possible to detect at the outset the specific tape upon which the data should be stored and therefrom also the specific predetermined area of the drum to which it should be initially set.

Since the magnetic drum is not a stop-start device, but rather rotates continuously, in order to pack information efficiently on the drum and to place it in a manner so that new or incoming information is not written over information already present which has not yet been transferred, it is necessary to use some type of indexing system whereby the incoming information is written in the proper location immediately succeeding previously written information and some type of warning must be given to prevent the previously mentioned overwriting.

There have been various attacks upon this problem. One of them is to use a supplemental track for each of the tracks into which data is being written. Marks are placed in these supplemental tracks, indicating where the end of the data which has been written occurs which can be detected by a magnetic reading head in time to permit the laying down of the succeeding information. Another known arrangement is to place at the end of each data sequence a mark indicative of the end of data which can be used for laying down the succeeding data. Still another arrangement is to allot specific space on the drum for the data being written. Then auxiliary equipment keeps track of the number of such spaces which have been filled in, and this auxiliary equipment can be used for directing the incoming data to the proper areas. All of these previous systems, while operative, require a great deal of auxiliary apparatus besides that actually needed for writing on the drum. In many instances they are timeconsuming in requiring the drum to go through a number of revolutions before a single writing operation can begin. Still another objection to the alternative systems is that they are space wasting.

An object of the present invention is to provide a novel and useful system for a magnetic drum for indicating a position for writing new data.

Another object of the present invention is to provide an inexpensive and simple indexing system for a magnetic drum.

Yet another object of the present invention is to provide an indexing system for a magnetic drum which is less wasteful of the drum space than the systems used heretofore.

These and other objects of the present invention are achieved by employing a single track on a magnetic drum wherein pulses are placed to indicate where incoming data should be written in a particular sector on the drum which is assigned for the storage of that data. In this embodiment of the invention, each track on the drum is divided into the same number of sectors and these are aligned. Thus across the entire axial length of the drum, the sectors begin and end at the same places. The spacing for each sector is sufficient to enter therein a desired number of characters comprising data being entered. Assuming that the drum is divided into ten sections, each section containing a number of tracks into which data is to be entered, there will be ten pulses employed in the single indexing track, which is identified as a last-item-marker track, for the purpose of indicating the position of the last item written in each one of these ten sections, and thus also the position for writing the next item.

The origin point across the entire drum is identified by a begin-band pulse which is marked on a single track of the drum. This begin-band pulse may be read separately. The sectors of the invention may be considered as running consecutively from the begin-band pulse origin point. The last-item-marker track, as previously pointed out, has only ten pulses recorded thereon, each pulse being associated with a different section of the drum. The location of each one of these last-item-marker pulses within a sector is the same, regardless of in which of the sectors in the last-item-marker track the pulse is recorded. As the sectors in each section continue to fill up, the last-item-marker pulse associated with that section will be advanced from sector to sector, being recorded in its position within the sector which follows that in which the last data or item was recorded in a section. There are two heads over the last-item-marker track. The first is the last-item-marker reading head, and the second, which follows it in the direction of drum rotation, is the last-item-marker writing head. The last-item-marker reading head is employed to generate the pulse which gates open the selected writing heads in the proper sector of the drum in order to write the incoming data in the proper position on the drum. The reading-head output is also utilized for the purpose of writing a last-item-marker pulse in the next sector after the data has been written and to erase the old last-item-marker pulse. After the data has been written, the remaining space on the track of the drum which has just been written into is measured to determine whether there is sufficient storage space for the next item of data. If not, an indication is given of that fact and provision may be made to assign a new section of the drum for the incoming data.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
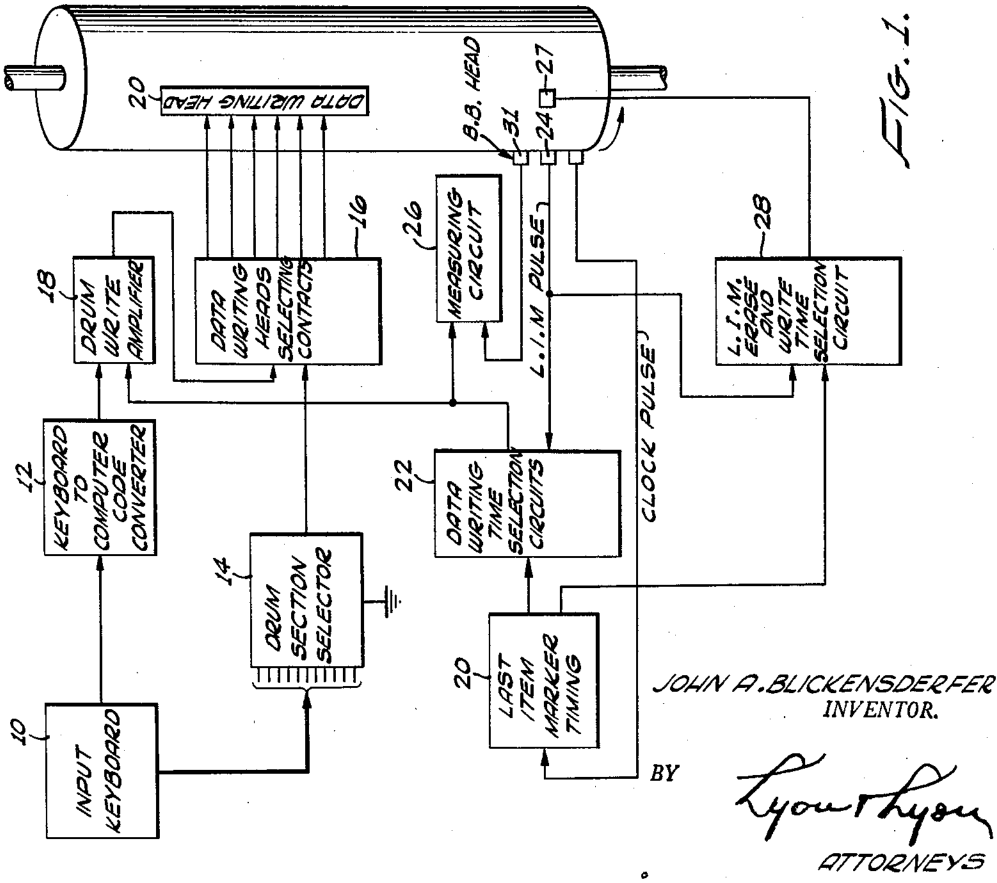
Figure 1 is a block diagram of an arrangement showing the utilization of an embodiment of the invention in an information-handling machine.

Reference is now made to Figure 1, which is a block diagram of an arrangement which may be broadly classified as a simplified input system to an information-handling machine, including an embodiment of the invention. In order to render the explanation herein more simple, a specific type of input data will be assumed. This input data will be considered as that derived from the face of the check. It will include the account number of a depositor and the deposit or withdrawal which is made on that particular day by the depositor. In order to enter this data into the information-handling machine, it is first punched into an input keyboard 10. The output of this keyboard is applied to a keyboard-to-computer code converter 12. A suitable keyboard and code converter arrangement is shown in an application by Bonnar Cox, Jacob Goldberg, and William H. Kautz for an Error-Checking System, Serial No. 539,504 now Patent No. 2,871,289, filed October 10, 1955. As explained in the above-mentioned application, each column of keys in the keyboard contains 10 keys. Each one of these keys, when depressed, is capable of energizing a relay in a keyboard-to-computer code converter, the contacts of which perform the necessary conversion from decimal to keyboard code. One column of keys into which there is always punched one of the account-number digits indicates into which one of the ten tapes which are employed as a permanent memory the data which is to be entered into the information-handling machine will eventually be stored. The key in this column which is depressed thus serves to energize one out of ten relays in a rectangle 14, which is labeled as the drum-section selector. The one of the relays which is energized closes contacts in the rectangle designated as data-writing-head-selecting contacts 16. Effectively, these comprise a contact arrangement whereby the output of the drum-write amplifier can be applied to the selected ones of the drum writing heads which are over the tracks in the section of the drum in which the incoming data will be written.

By means of mechanism designated as last-item-marker timing 20, which receives clock pulses from the drum, a data-writing-time-selecting circuit 22 selects as its output the last-item-marker pulse which indexes the location of the last item which is marked in the section desired to be written into. This pulse is read by the last-item-marker-pulse reading head 24. The output of the data-writing-time-selecting circuits comprises an enabling pulse to the drum-write amplifier, which enables the data which is in the output of the keyboard-to-computer code converter to be entered through the drum-write amplifier and the selected writing heads over the drum into the assigned section of the drum. After this data has been written, a measuring circuit 26 serves the purpose of determining whether or not another sector remains for any data which may be coming in subsequently. If another sector remains before the end of the track, then the measuring circuit provides no further indication thereof. However, if no room remains, then the measuring circuit provides a warning and serves the function of preventing the loss of data on the drum. Last-item-marker-erase-and-write-time-selection circuit 28 serves the function of erasing the old last-item-marker pulse and writing a new last-item-marker pulse in the proper location in the next sector.

At this time it should be noted that no detailed discussion has been given as to whether the data which is being written into a section of the drum is written in parallel fashion on a number of tracks on the drum simultaneously or serially in a single track, which when filled is followed by a succeeding track. The method employed for writing makes no difference. The last-item-marker arrangement may be used to index either writing system. It is appreciated that in the case of the employment of the system wherein the data is written serially into one track at a time, the track may fill up more quickly. However, since such a system does require that only one track at a time be written into, the last-item-marker indexing system may still be used since it indicates that in the track which is available for writing, such writing should commence at a sector in accordance with the location of the last-item-marker pulse associated with the section of the drum within which such available track is found.

By way of illustration, in an application for a Buffer Storage System, by William H. Kautz, previously referred to herein, there is described a temporary storage system employing the last-item-marker indexing arrangement as shown in this application, wherein each assigned section of the drum consists of eight tracks which are filled in sequence. There are ten such drum sections assigned at any one time. Only one last-item-marker track is used. In accordance with the principles explained herein, the last-item-marker for a given section of the drum advances from sector to sector, and when a track is filled then the last-item-marker is advanced around the begin-band-pulse region of the drum into the first sector on the other side of the begin-band pulse to index anew the succeeding track which is assigned for entry of data in the associated drum section.

Figure 2:
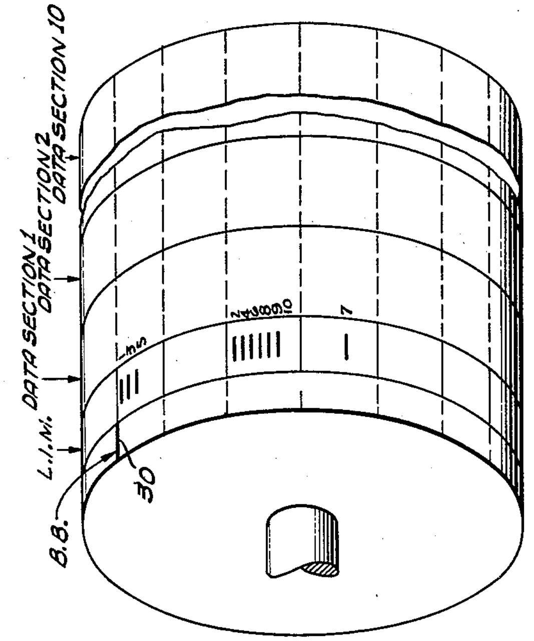
Figure 2 shows a section of a drum surface which is shown for the purpose of making the explanation of the embodiment of the invention more simple.

Referring now to Figure 2, there is shown a section of the surface of the drum. It is appreciated that the magnetic recording of a pulse is not visible on a drum; however, for the purposes of illustrating the principles of this invention, they will be considered as being visible. The origin of the drum is identified by a begin-band pulse 30 which is located in a separate track. A separate reading head 31 is available for indicating when this begin-band pulse occurs. The last-item-marker track has recorded therein ten pulses. It should be clearly understood that the ten pulses constitute the total number of pulses recorded in the entire last-item-marker track. The disposition of these ten pulses is determined by the location of the last item which had been written in the section of the drum with which the last-item-marker pulse is associated. The sectors are represented on the drawing as dotted lines.

It should be appreciated that there are no separate sector markings as such. In the first sector on the last-item-marker track, there are found recorded pulses 1, 3, and 5. This indicates that no data has yet been written into the sections of the drum with which pulses 1, 3 and 5 are associated. In the third sector, there are found pulses 2, 4, 6, 8, 9, and 10. This indicates that the last item was written in sectors 2 of the tracks in the sections of the drum associated with these pulses. Last-item-marker pulse 7 is found in the fourth sector, indicating that the data written in the track with which the last-item-marker pulse 7 is associated was written in the third sector of the track. As data is entered in the track which is indexed by the first last-item-marker pulse, the last-item-marker pulse will successively be written in the second sector, then the third sector, and so forth, but in each sector it occupies the identical position as it occupied in the preceding sector. The last-item-marker pulse is erased from the preceding sector and written into the succeeding one so that in the entire track only one number "one" last-item-marker pulse is found. The same rules apply to the other last-item-marker pulses.

Figure 3:
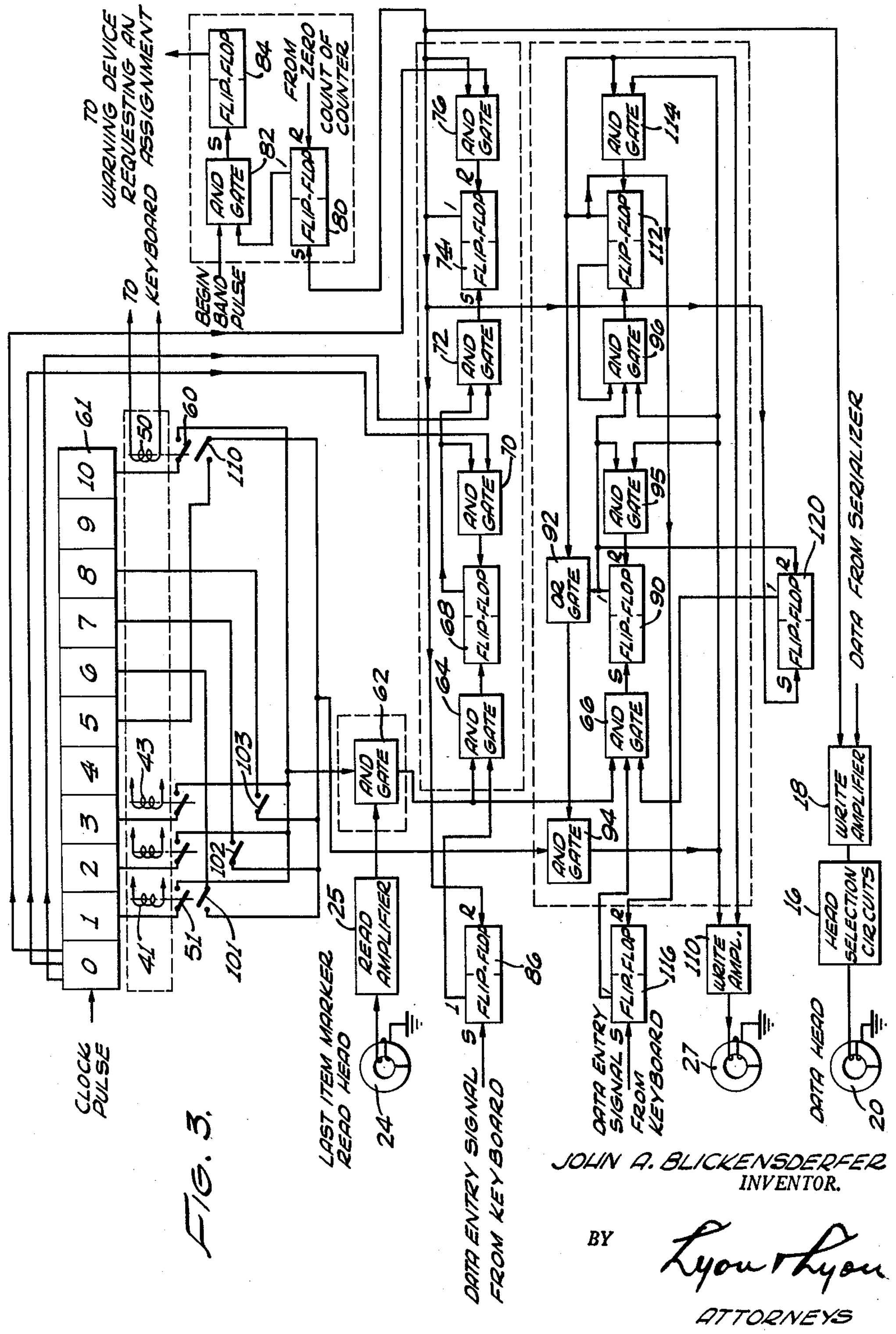
Figure 3 shows a block schematic of an embodiment of the invention.

Reference is now made to Figure 3, which shows in detail a block diagram of the embodiment of the invention. As is shown in more detail, the drum-section selectors 14 comprise ten relay coils 41 through 50, any one of which may be selected as the result of the actuation of the key to which it is connected in the input keyboard. As previously stated, such actuation occurs as a result of entering into the input keyboard an account number, one digit of which is employed for identifying the relay-drum section and final tape on which such account number and the accompanying data will finally be stored. The relays of the drum-section selectors each have at least one set of contacts which are energized and are included in the rectangle 16 in Figure 1. These contacts are not shown in Figure 3, since they would only complicate the drawing without adding to an understanding of the invention. These contacts are the ones which close to connect the drum-write amplifier 18 (representative of the number required) to the selected ones of the drum writing heads over the section of the drum which is the one in which the incoming data is to be stored. The contacts shown in Figure 3 are the ones invloved in this invention. There is a pair of contacts on each relay, respectively designated as 50 through 59, which are included in the last-item-marker timing circuitry designated by the rectangle 20. Also included in the timing circuitry are the counter 60 and the AND gate 62. The counter 61 comprises any well-known type of ring counter, or cyclic counter, having a capacity at least equal to the number of last-item-marker pulses. Clock pulses are derived from the drum in a manner well known in the art. By way of illustration, one arrangement obtaining clock pulses from the drum is shown in a patent to Brustman et al., No. 2,702,380. These pulses occur substantially simultaneously with the desired magnetic-pulse location in a magnetic drum. Thus, a selection is made of eleven clock pulses, the last ten of which occur at the ten locations desired for the ten last-item-marker pulses in each sector. The first, or zero, pulse occurs at the beginning of a sector. The second of these clock pulses and the first location selected for a last-item-marker pulse should be in the same location as that in which the first magnetic pulse representative of the first binary digit of the data being entered in the data track will be stored in the sector. Expressed more simply, the first last-item-marker pulse is positioned in the same location as the first digit will be positioned in the corresponding sectors axially displaced along the drum. The first clock pulse applied to the counter energizes the zero-count stage of the counter to provide an output. A second clock pulse applied to the counter turns off the zero-count stage and turns on the one-count stage. This progression occurs in response to the sequence of the eleven selected clock pulses within the sector. The last stage of the counter is turned off and the zero stage of the clock counter is turned on in response to the clock pulse occurring at the beginning of the next sector on the drum.

From the above discussion, it should become apparent that when any one of the contacts 51 to 60 are closed a pulse will be applied to these contacts from the stage of the counter to which they are connected when that counter stage is energized. Such energization occurs in response to a clock pulse occurring at the time the last-item-marker pulse passes under the last-item-marker read head 24. Thus, if contacts 52 were closed, then a pulse would be applied from the third stage of the counter 61 through these contacts to the AND gate 62. At this time, the third marker pulse would be passing under the last-item-marker read head 24. This would then be amplified by the amplifier 25 and applied to the AND gate 62. Upon the presence of the coincidence of inputs to AND gate 62, an output is applied from this AND gate to two succeeding AND gates, respectively designated as 64 and 66.

From the above it is apparent that the output from AND gate 62 occurs only when the last-item-marker pulse selected by means of the relays in the drum-section selector passes under the last-item-marker read head 24. This read head will thus have only one output per revolution of the drum corresponding to the fact that the last-item-marker pulse occurs only once in the last-item-marker track of the drum. The structure to be described now is that of the data-writing-time-selecting circuit 22. This includes a flip-flop 68, which is turned over or driven from one stable condition to a succeeding stable condition upon an output being received from AND gate 62. The output of this flip-flop is applied to resetting AND gate 70, the output from which is applied to the flip-flop 68 to reset it as shown and also is applied to a succeeding AND gate 72, the output from which is employed to set or drive a flip-flop 74. Upon the occurrence of the next sector location into which the data which has been converted by the keyboard-to-computer code converter 12 is to be written, AND gate 72 applies an output to flip-flop 74 and AND gate 70 applies an output to flip-flop 68 to reset it.

The second required input to the two AND gates 70, 72 is derived from the zero-count stage of the counter 60, which provides an output at the beginning of the location in each sector wherein there should be written the first bit of data. Thus, flip-flop 74, when turned over, applies its output to the writing amplifier 18, which simultaneously has applied thereto data from the keyboard-to-computer code converter 12. The writing amplifier is thus gated open to write, through the head-selecting circuit 16, onto the drum data, which is received from the keyboard-to-computer code converter.

AND gate 76 has as one of its inputs the output of flip-flop 74 when in its set condition and as its other required input output from the zero-count stage of the counter 60. AND gate 76 is then able to produce an output to reset flip-flop 74 at the beginning of the next sector of the drum. This occurs because AND gate 76 does not receive one of its required inputs from the flip-flop 74 until the beginning of the preceding sector on the drum. When flip-flop 74 is reset in response to the output of AND gate 76, it removes the enabling input from the write amplifier 18 and thus no further data can be entered onto the drum until a subsequent writing cycle occurs.

The output of flip-flop 74 when in its set state is also applied to a flip-flop 80. This flip-flop and its subsequent circuitry are included in the rectangle designated as the measuring circuit 26 on Figure 2. Flip-flop 80 is set when it receives the output from flip-flop 74 and is reset upon the occurrence of the next zero count of the counter. The output of flip-flop 80 in its set condition is applied to an AND gate 82. As a second required input to AND gate 82 is the begin-band pulse. The output of AND gate 82 is applied to another flip-flop 84. From the above, it should be noted that flip-flop 80 provides an output for a time lasting until the beginning of the next sector on the drum following the one which was written into. If a begin-band pulse occurs prior to the occurrence of the following sector, an output is obtained from AND gate 82 and this serves to turn over flip-flop 84. The output of flip-flop 84 may be employed for the purposes of requesting a new track assignment for the same tape assigned data or any other desired action at this time. If no begin-band pulse occurs prior to the occurrence of the next sector, then there is no output from the AND gate and the appartus can continue to function as has been previously described.

Flip-flop 86 is employed for the purpose of insuring that the operation of flip-flops 68 and 74 does not recur for every cycle of the drum. At the time the data is entered in the keyboard, the operator pushes what is commonly known as a data-entry key (not shown), which is to signal the following information-handling machine that the data is all on the keyboard and should be entered into the system. This data-entry key initiates a signal which turns over flip-flop 86. The output of this flip-flop is applied as a second required input to the following circuitry to operate. When flip-flop 74 is driven by the output of AND gate 72, its output is also applied to reset flip-flop 86. This blocks AND gate 64 and no further signals are emitted therefrom until the next time that a data-entry signal from the keyboard is received to set flip-flop 86. Of course, the next data-entry signal from the keyboard is not received until the new data is entered into the keyboard. The arrangement described does insure that the data-writing-time-selecting circuits do not operate cyclically with the drum.

After the data has been written onto the drum it is necessary to move the last-item marker to signify the end of the data which has just been written to enable tacking any new incoming data on the end of the data which has just been written. This apparatus is that which is designated in Figure 1 as the L–I–M erase-and-write-time-selection circuit 28. AND gate 66, upon receiving all its required inputs, provides an output to turn over flip-flop 90 at a time when the last-item-marker pulse occurs the first time after writing data. To insure that the L–I–M mark is not erased until after the new data has been written on the drum the output of flip-flop 74, when in its set state, is applied to a flip-flop 120 to put it in its set state. The output of flip-flop 120, when in its set state, is applied to AND gate 66. A second required input is provided from flip-flop 116. A third required input which then causes AND gate 66 to drive flip-flop 90 is obtained from AND gate 62 when the last-item-marker pulse is read after the data has been written. The output of flip-flop 90 is applied to an OR gate 92, to an AND gate 95, a second AND gate 96, and also resets flip-flop 120. The output of flip-flop 90 is also applied through the OR gate 92 to an AND gate 94.

At this time, cognizance should be taken of the fact that there are two heads over the last-item-marker track. The first one of these heads in the direction of rotation of the drum is the last-item-marker reading head 24 and, at a distance of one-sector space plus five last-item-marker spaces, later on along the drum is found the second or last-item-marker writing head 27. Thus a second required input to AND gate 94 is derived from the counter five count intervals or clock pulses away from the time of the reading of the last-item-marker pulse. This is insured by another set of contacts 100 through 109, which are energized simultaneously with the contacts 50 through 59. Each one of these second set of contacts is connected to receive the output from the counter state five counts later than the one with which the associated first set of contacts receives an output. Thus, the pair of contacts 101 applies an output from counter state 5 to AND gate 94. The pair of contacts 102 would apply the output of counter stage 6 to AND gate 94, etc. The pair of contacts 110 would apply the output of counter stage 4 to AND gate 94. Thus, AND gate 94 is enabled to provide an output to the writing amplifier 110 five count intervals after the last-item-marker pulse has been read. At this time, reading head 27 is over the old last-item-marker pulse. Write amplifier 110 is designed so that when an input is received on one of its input leads it will write a "zero" and when an input is received on both of its input leads it writes "one." In the present instance, AND gate 94 applies an input to only one of its input leads, and, therefore, the write amplifier causes the writing head 27 to write a zero over the position of the old last-item marker. This effectively erases the old last-item marker. The output of AND gate 94 is simultaneously applied to AND gates 94 and 96. The AND gate 94 has now the two inputs required to provide an output to flip-flop 90. Flip-flop 90 is reset thereby. AND gate 96 at this time also has the three required inputs for it to provide an output. Therefore, its output is applied to the succeeding flip-flop 112, which is set thereby. Flip-flop 112 applies its output to OR gate 92 again, and to the second input of write-amplifier 110. OR gate 92 applies its input to AND gate 94.

When the counter 60 has cycled around back to the five count again, indicative of the fact that one complete sector space has passed, AND gate 94 is again enabled. Its output is applied to the write amplifier 110. This time, in conjunction with the output from flip-flop 112, write amplifier 110 is enabled to write a one over the last-item-marker space in the new sector, which corresponds to the last-item-marker space in the sector in which the last-item marker was just erased. The output from AND gate 94 is also employed this time to reset flip-flop 112 through AND gate 114, which has as its second required input the output from the set side of flip-flop 112. Thus, after writing the one to indicate the new last-item-marker position, write amplifier 16 is disenabled and the circuitry contained in rectangle 28 is restored to its standby condition. A flip-flop 116 is employed to prevent the cyclic operation of the circuitry contained in rectangle 28. This flip-flop 116 is set when the data-entry key at the keyboard is depressed to signify that data should be entered and is reset when flip-flop 112 is set. Thus AND gate 64 is held open for the time required to complete one cycle of operation of the circuitry included in rectangle 128. After that, the AND gate is maintained closed until the data-entry key on the keyboard is depressed once again.

Figure 4:
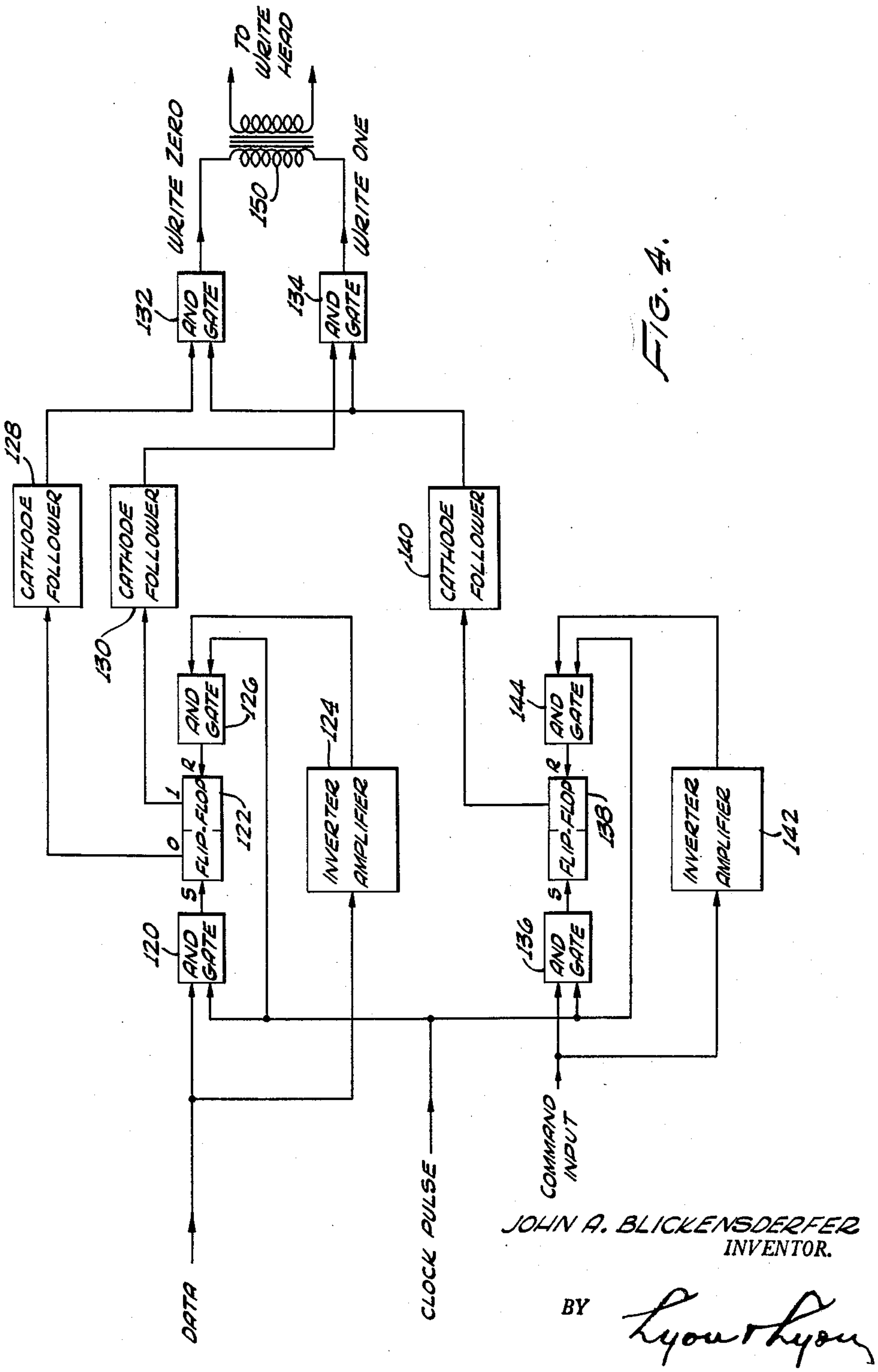
Figure 4 is a schematic drawing of the write amplifier employed in this invention.

Reference is now had to Figure 4, which shows the circuit details of the arrangement employed in the write amplifiers 110 and 18, whereby in the presence of a command pulse the drum write amplifier will write a zero and in the presence of both a command and data pulse the drum write amplifier will write a one. The data input is applied to an AND gate 120, which also has as a second required input a clock pulse for the purpose of timing the writing in on the drum of the data. The output of AND gate 120 is applied to a flip-flop 122. The flip-flop is set by such AND gate output. In the absence of a data input to flip-flop 122, the inverter amplifier 124 provides an input to AND gate 126, which in conjunction with a clock pulse serves the function of resetting flip-flop 122. Thus, whenever a data or one pulse is applied to the AND gate 120, flip-flop 122 is placed in a condition with its one output high. In the absence of such data-input pulse, flip-flop 122 is in a condition with its zero output high. The one and zero outputs are applied through respective cathode followers 128, 130 to succeeding AND gates 132, 134.

A second required input to these AND gates 132, 134 is applied from the command input. The command input is applied to an AND gate 136. A second required input is applied from the clock-pulse source. Thus, upon the receipt of a command, input AND gate 136 applies an output to set the succeeding flip-flop 138. The flip-flop 138 applies its one output through a cathode follower 140 to the two AND gates 132, 134. In the absence of a command input inverter amplifier 142 applies an output to AND gate 144 which receives as its second required input the clock pulse. Therefore, AND gate 144 will reset the flip-flop 138 upon the absence of a command input. Both inverter amplifiers 124 and 142 are amplifiers which are biased in the conducting region so that the negative input either of the data or command input biases them off and upon the absence of a data input these inverter amplifiers become conducting again, applying a negative-output pulse to the AND gates which follow them.

AND gates 132 and 134 serve as a type of phase-inverting input to the transformer 150 by means of which they are coupled to the writing head. Thus, when AND gate 132 is enabled to provide an output a zero is written by the writing head, and when AND gate 134 is enabled to provide an output the current through the transformer is reversed and the writing head writes one. It should be noted that in the presence of a command input AND gate 132 is enabled and a zero is written. In the presence of a data input, as well as a command input, then AND gate 134 is enabled and the writing head will write a one on the magnetic drum.

The actual structure of the flip-flop gate and counter described as being utilized in the embodiment of the invention has not been described in detail herein, since these are well known in the art. By way of illustration, suitable circuitry can be found described in the book Electronics, by Elmore and Sands, published by the McGraw-Hill Book Company in 1949. Suitable types of flip-flops are found described on pages 105 et seq.; suitable types of AND gates and OR gates are found described and shown on pages 118 et seq. Suitable types of ring counters are commercially purchasable and need not be described in further detail.

From the above it may be seen that there has been described a novel, useful, and simple arrangement for maintaining an indication of the end of data which has been written into different sections of a drum. Such indication is maintained on a single track for an entire drum. Although the description of the drum-indexing system has been made in connection with a buffer store which receives its data from an input keyboard, this should not be considered as a limitation. The apparatus described herein may be employed within the computer or information-handling machine receiving its data input from sources other than a keyboard.

I claim:

1. In a magnetic drum storage system of the type wherein different incoming items of data are to be stored in preassigned different sections thereof, said drum having aligned item-storage sectors over the periphery thereof, apparatus for indicating with associated magnetic marker pulses in a single track the next available item-storage sector in each of said drum sections comprising means for recording each of said marker pulses in a preassigned location in a sector in said single track which follows the sector in the associated section in which the last item was recorded, said means including a magnetic reading head over said single track, a magnetic writing head over said single track spaced a predetermined distance after said writing head, means to produce a selected pulse from the output from said magnetic reading head for an incoming item of data responsive to the magnetic marker pulse which is associated with the sector in which said incoming item is to be stored, means responsive to the selected pulse to write said incoming data in the sector aligned with the sector from which said selected pulse was derived, means responsive to said selected pulse to energize said writing head to erase said magnetic marker pulse from which said selected pulse was derived, and means responsive to said selected pulse to energize said writing head to write a new associated marker pulse in the preassigned location in the sector succeeding the one from which the marker pulse was erased.

2. Apparatus as recited in claim 1 wherein said means to produce a selected pulse from the output from said magnetic reading head for an incoming item of data includes a counter having the same number of different count stages as there are marker pulses, means to generate a pulse for each marker pulse storage location around said single track, means to drive said counter with the output from said means to generate a pulse, a relay means to select the output from one of said different count stages responsive to said incoming data item, gate means coupled to said reading head and said relay means, and means to derive said selected pulse as output from said gate means responsive to the simultaneous input thereto from said writing head and said relay means.

3. Apparatus as recited in claim 1 wherein said means responsive to the selected pulse to write said incoming data in the sector aligned with the sector from which said selected pulse was derived includes at least one data writing head for a section positioned over a data track of said drum at a first digit-storage position on the sector following the sector over which said reading head is positioned, a normally disenabled write amplifier coupled to drive said data head, a first flip-flop having two stable conditions, means to drive said first flip-flop from one to the other of its two stable conditions responsive to said selective pulse, a second flip-flop having two stable conditions, means to generate a first pulse every time a first digit storage position in a sector is under said data writing head, means to drive said second flip-flop to its second stable condition responsive to said first pulse and output from said first flip-flop when in its second stable condition, and means to apply the output of said second flip-flop in its second stable condition to enable said write amplifier, and means to reset said second flip-flop responsive to a succeeding first pulse.

4. Apparatus as recited in claim 1 wherein said means responsive to said selected pulse to energize said writing head to erase said magnetic marker pulse from which said selected pulse was derived includes a first flip-flop having a first and second stable condition, means to drive said first flip-flop from said first to said second stable condition responsive to said selected pulse, means to derive from said means to produce a selected pulse a delayed pulse for each drum sector, said delayed pulse following said selected pulse by the time required for said drum to rotate said associated magnetic marker pulse from under said reading head to under said writing head, and gate means to energize said writing head to erase said magnetic marker pulse responsive to said delayed pulse and the output from said first flip-flop when in said second stable condition; and wherein said means responsive to said selected pulse to energize said writing head to write a new associated marker pulse includes a second flip-flop having a first and second stable condition, means to drive said second flip-flop to its second stable condition responsive to output from said first flip-flop when in its second stable condition and to output from said gate means, means to apply output from said second flip-flop when in its second stable condition to said gate means, means to derive an output from said gate means responsive to a succeeding delayed pulse and said second flip-flop output, and means to energize said writing head to write a magnetic marker pulse responsive to output from said gate means and said second flip-flop output.

5. In a magnetic drum storage system of the type having an origin marker wherein different incoming items of data are to be stored in preassigned different sections thereof, said drum having aligned item-storage sectors over the periphery thereof, apparatus for indicating with associated magnetic marker pulses in a single track the next available item storage sector in each of said drum sections comprising means for recording each of said marker pulses in a preassigned location in a sector in said single track which follows the sector in the associated section in which the last item was recorded, means for selecting one of said marker pulses for an incoming item of data, said means for selecting including means for generating a pulse for each first digit-storage position in a sector, means for generating a write command pulse responsive to output from said means for selecting and the first output pulse thereafter from said means for generating, means for writing said incoming item of data into the next available sector in the preassigned drum section responsive to said write command pulse, means responsive to said write command pulse to determine whether another sector is available following the one into which said item has been written, means responsive to output from said means for selecting to erase the selected one of said marker pulses, and means to energize said means for recording to record a marker pulse in the preassigned location for the erased pulse in the succeeding sector of said single track.

6. In a magnetic drum storage system as recited in claim 5 wherein said means responsive to said write command pulse to determine when another sector is available following the one into which said item has been written comprises a first flip-flop circuit having a first and second stable condition, means to drive said first flip-flop from said first to said second stable condition responsive to said write pulse, means to drive said first flip-flop from its second to its first stable condition responsive to output from said means for generating a pulse for each first digit storage position in a sector, means to generate a pulse from said origin marker, a gate, means to derive an output from said gate responsive to the coincident application thereto of output from said flip-flop and from said origin marker, and means to indicate no further sector space available responsive to said gate output.

7. In a system wherein different incoming items of data are to be stored in preassigned different sections of a magnetic drum, apparatus for indicating with magnetic marker pulses in a single track the next available storage space in each of said different drum sections after previously stored items, said apparatus comprising means for selecting one of said plurality of marker pulses for an incoming item of data which is to indicate the next available storage space in the drum section assigned for storage of said data item, said means for selecting one of said plurality of marker pulses including means to generate a pulse for each marker pulse storage position around said single track, a counter having the same number of different count stages as there are marker pulses, means for driving said counter responsive to the output of said means to generate a pulse, means for selecting the output of one of said counter stages responsive to said incoming data item, means for reading said marker pulses, and means to generate an indicating pulse responsive to the simultaneous occurrence of the selected output from said counter and a pulse from said means for reading, means for writing said incoming data item into said assigned drum section responsive to the occurrence of said selected marker pulse, means for erasing said selected marker pulse subsequent to its selection for said writing, and means for writing another marker pulse in a preassigned subsequent position on said single track representative of the next available storage space after the data which has just been written.

References Cited in the file of this patent

UNITED STATES PATENTS

| | | |
|---|---|---|
| 2,587,532 | Schmidt | Feb. 26, 1952 |
| 2,614,169 | Cohen et al. | Oct. 14, 1952 |
| 2,797,378 | Johnson | June 25, 1957 |